(12) United States Patent
Krishnamoorthy et al.

(10) Patent No.: US 6,700,344 B1
(45) Date of Patent: Mar. 2, 2004

(54) METHOD OF CONTROLLING THE SPEED OF AN ARM OF A DISK DRIVE

(75) Inventors: Ravishanker Krishnamoorthy, Singapore (SG); Hin Sing Fong, Singapore (SG)

(73) Assignee: STMicroelectronics Asia Pacific (PTE) Ltd., Singapore (SG)

( * ) Notice: Subject to any disclaimer, the term of this patent is extended or adjusted under 35 U.S.C. 154(b) by 0 days.

(21) Appl. No.: 09/868,275

(22) PCT Filed: Dec. 16, 1998

(86) PCT No.: PCT/SG98/00105
§ 371 (c)(1),
(2), (4) Date: Nov. 20, 2001

(87) PCT Pub. No.: WO00/36604
PCT Pub. Date: Jun. 22, 2000

(51) Int. Cl.$^7$ .................................................. G05B 5/00
(52) U.S. Cl. ...................... 318/461; 318/254; 318/138; 318/439; 318/560; 318/599; 388/800
(58) Field of Search ............................ 318/254, 138, 318/439, 461, 560, 599; 388/800, 804, 842, 928.1

(56) References Cited

U.S. PATENT DOCUMENTS

| 4,491,776 A | 1/1985 | Veale ........................ 318/561 |
| 4,864,437 A | 9/1989 | Couse et al. ................. 360/75 |
| 4,967,291 A | 10/1990 | Touchton et al. ......... 360/78.04 |
| 5,221,881 A | 6/1993 | Cameron ................... 318/254 |
| 5,285,135 A | 2/1994 | Carobolante et al. ...... 318/254 |
| 5,297,024 A | 3/1994 | Carobolante ................ 360/67 |
| 5,325,030 A | 6/1994 | Yamamura et al. ......... 318/563 |
| 5,566,369 A | 10/1996 | Carobolante ................. 360/75 |
| 5,615,064 A | 3/1997 | Blank et al. .................. 360/75 |
| 5,831,786 A | 11/1998 | Boutaghou et al. ........... 360/75 |
| 6,081,112 A | 6/2000 | Carobolante et al. ....... 324/177 |
| 6,339,303 B1 * | 1/2002 | Heeren ....................... 318/254 |
| 6,373,650 B1 | 4/2002 | Pedrazzini ................... 360/75 |

FOREIGN PATENT DOCUMENTS

| EP | 0 667 615 A1 | 8/1995 |
| EP | 0 919 992 A1 | 6/1999 |
| JP | 61-150687 | 7/1986 |
| JP | 63-274386 | 11/1988 |

OTHER PUBLICATIONS

Pedrazzini, "IBM Hard Disk Drive Load/Unload Technology," *Computer Data Storage Newsletter*, vol. 10#7, Issue No. 114, p. 12, Jul. 1997.

Schlager, K. M., "Time Domain Voice Coil Motor Control Circuit and Method," U.S. Application No. 09/159,072, filed Sep. 21, 1998, Assignee: STMicroelectronics, Inc.

* cited by examiner

*Primary Examiner*—Karen Masih
(74) *Attorney, Agent, or Firm*—Lisa K. Jorgenson; Robert Iannucci; Seed IP Law Group PLLC

(57) ABSTRACT

A system for controlling the speed of an arm of a disk drive, including a feedback circuit for generating a feedback signal representative of the speed of the arm, and a drive circuit for comparing the feedback signal with a predetermined command signal representing a command speed, and adjusting a drive signal for a motor to drive the arm at the command speed. The feedback signal, which represents the back EMF of the motor, is compared with the command signal to determine an acceleration state of the arm and the acceleration state is used with a previous acceleration state to determine whether to adjust a predetermined level at which the motor is driven.

37 Claims, 2 Drawing Sheets

METHOD OF CONTROLLING THE SPEED OF AN ARM OF A DISK DRIVE

The present invention relates to a method of controlling the speed of an arm of a disk drive and, more particularly, to a method of controlling the speed of parking the arm on a ramp.

A data storage disk drive consists of al least one disk on which data is stored, a read/write head mounted on an arm to read or write on the disk surface, and the necessary control circuits. The disk is rotated at a constant velocity by a spindle motor and the arm is moved over the disk surface to read from or write to different locations on the disk surface by a voice coil motor (VCM).

When there are no read or write operations for a relatively long time or upon power down of the disk drive, the VCM arm is traditionally parked towards the inner diameter of the disk. This is necessary to avoid any damage to the surface of the storage medium by physical contact with the read/write head. The storage area of the disk is generally made smooth to maximize the data density. If the arm is parked on the smooth surface, the spindle motor will experience more friction when it starts to spin the disk. To avoid this friction, the surface of the disk over which the arm rests can be made with a particular texture. This method of parking has two main disadvantages: the effective area that can be used for storage is reduced; and the read/write head will wear more quickly.

To avoid the problems mentioned above associated with parking the arm at the inner diameter of the disk, the arm can be parked away from the disk surface. The arm can be moved over a ramp at the outer edge of the disk. It is desirable to be able to actively control the speed of the arm to deliver the arm to the ramp as fast as possible without damaging the disk drive.

In accordance with the present invention there is provided a method of controlling the speed of an arm of a disk drive, including the steps of:

obtaining a feedback signal representative of the speed of said arm;

comparing said feedback signal with a predetermined command signal representing a command speed to determine an acceleration state of said arm; and adjusting a drive signal for a motor to drive said arm at said command speed, said drive signal being adjusted, depending on said acceleration state, to drive said motor at a predetermined level.

The present invention also provides a system for controlling the speed of an arm of a disk drive, including:

feedback means for generating a feedback signal representative of the speed of said arm; and drive means for comparing the feedback signal with a predetermined command signal representing a command speed to determine an acceleration state of said arm and for adjusting a drive signal for a motor to drive said arm at said command speed, said drive signal being adjusted, depending on said acceleration state, to drive said motor at a predetermined level.

A preferred embodiment of the present invention is described in greater detail below, by way of example only, with reference to the accompanying drawings, in which.

Figure 1:
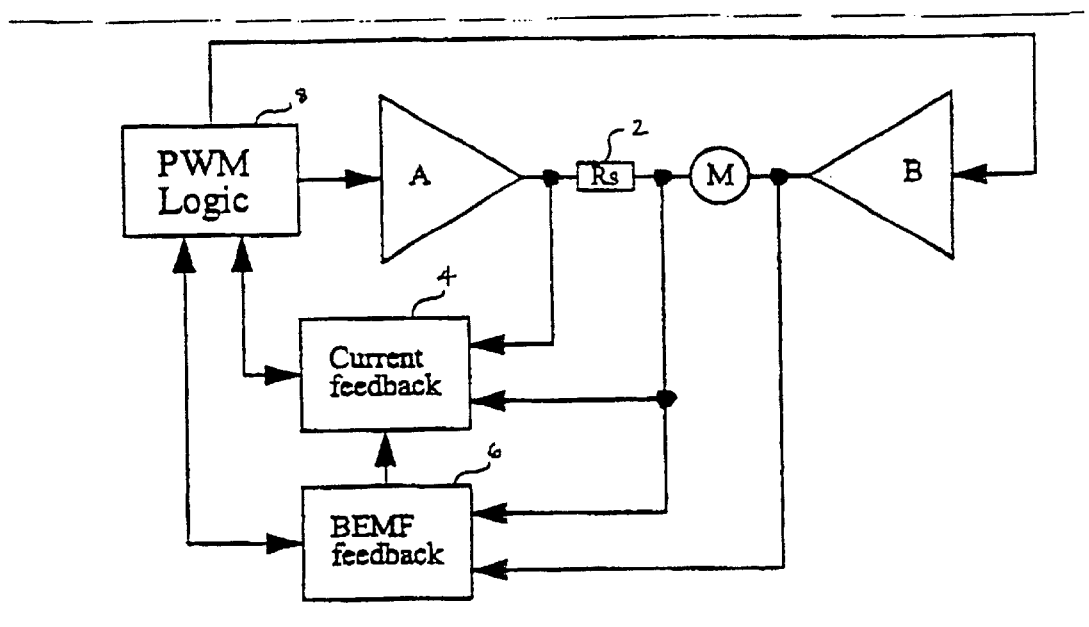
FIG. 1 is a block diagram of a preferred embodiment of a VCM system.

In the embodiment of the VCM system shown in FIG. 1 a voice coil motor M is driven by two complimentary drivers A and B. The PWM logic 8 controls these two drivers with PWM drive signals based an the feedback information on the motor current $I_m$ and the back electromotive force (BE) of the motor. The BEMF is sampled by a BEMF feedback circuit 6 across the motor, when the current is zero during the down-pulses of the PWM cycle of the PWN logic 8. The current through the motor $I_m$ is detected by a current feedback circuit 4 by a sensor resistor ($R_s$) 2 connected in series with the motor. The PWM logic 8 is responsive to a current feedback signal generated by the current feedback circuit 4, representative of the current $I_m$, to adjust the drive signals for the drivers A and B so as to drive the motor at a motor current limit $I_{limit}$. The PWM logic 8 adjusts the value $I_{limit}$ as described below, based on a BEMF signal generated by the BEMF feedback circuit 6 that represents the BEMF and the speed of the motor.

Figure 2:
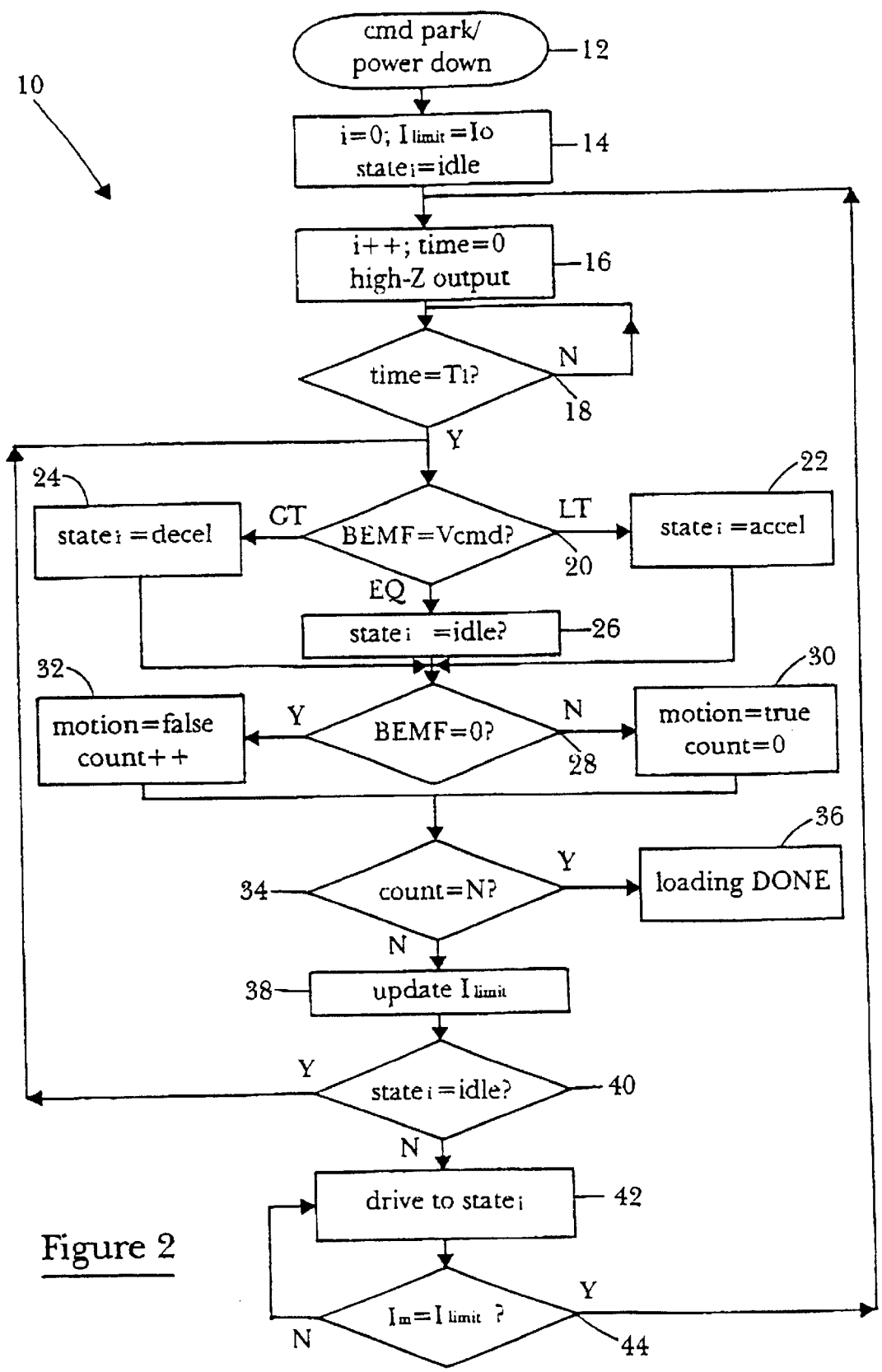
FIG. 2 is a flow chart of a method of adaptively controlling the speed of an arm of a VCM system.

The steps executed by the system are shown in FIG. 2. When commanded to park or there is a power down at step 12, the arm is driven at a preprogrammed or command speed towards the ramp, and then driven up the ramp at the command speed to complete the parking. The command speed is chosen to be small enough to avoid the situation whereby the arm hits the ramp at a relatively high speed, bounces back and damages the disk.

The speed of the motor is determined by a drive voltage, Vdrv, provided by the drivers A and B across the motor M. The current through the motor has an upper limit determined by the value of $I_{limit}$, and, together with Vdrv, defines the maximum power delivered to the motor for a given acceleration state of the arm. The speed of the arm is determined to have one of three acceleration states at any given time: accelerate, decelerate and idle; and the acceleration state number is given by "i" (e.g. $state_1$=accel; $state_{i-1}$=idle).

Initially, at step 14, the current limit value $I_{limit}$ is set to a predefined value $I_0$, the number of the state is set to zero and the initial state is set to "idle". At step 16, the number of the state variable "i" is incremented and the timer is reset. After tri-stating the output of the drivers and waiting until the timer has been on for a period of time $T_1$ at step 18 (for the recirculation of tile current to die down), the BEMF of the motor is sensed by BEMF feedback 6 at the motor terminals. The next state is determined at step 20 based on a comparison of the measured BEMF and a command voltage signal Vcmd. The level Vcmd of the command voltage is representative of the desired command speed at which the motor is to be driven. If the measured BEMF is greater than Vcmd, the state is determined in step 24 to be "decel". If the measured BEMF is less than Vcmd, the state is determined in step 22 to be "accel". If the measured BEMF is equal to Vcmd, the state is determined in step 26 to be "idle". Then, whether or not the motor is in motion is determined by checking for zero BEMF in step 28, whereby if the BEMF is zero, it is determined that there is no motion. If there is no motion, a time counter "count" is incremented at step 32. If there is motion, the counter is reset at step 30. The counter is compared with a preset value N at step 34, and if there is a lack of motion, this indicates that the arm has been loaded on the ramp and that it has encountered a mechanical stopper and the loading is determined to be done at step 36. Otherwise, at step 38, using the last two states, the current limit value $I_{limit}$ is updated (according to the algorithm shown in Table 1 below).

Since the torque applied to the motor is proportional to the current (if the motor is moving), different current limit values will result in different torques per PWM cycle delivered by the PWM logic 8. At step 40, if the current state is "idle", the process returns to step 20, where the BEMF is monitored to update the next state. When the present state is not "idle" (i.e. either "accelerate" or "decelerate"), the output drivers are driven at step 42 in an appropriate direction until the motor current $I_m$ reaches the current limit value $I_{limit}$ at step 44. Then the process returns to step 16 and the BEMF is sampled and compared with Vcmd at step 20 after tri-stating the output drivers and waiting at step 18 until the timer has been on for a period of time $T_1$.

After a certain number of cycles, the arm will be driven at a constant speed corresponding to the command BEMF voltage. When the arm is climbing the ramp, it experiences additional friction which reduces the speed, and in-turn a lesser BEMF is produced. The feedback loop adjusts the current limit value to provide the required torque per PWM cycle to maintain the command speed.

An advantage of the adaptive current limit value is that until the command speed is achieved, the current limit is modified to provide more torque to achieve the command speed in a shorter time. Once the commanded speed is achieved, the current limit value is minimised, and hence the torque applied in each PWM cycle is smaller, resulting in a smoothly controlled speed.

Table 1 shows the algorithm for changing the current limit value. The current limit value $I_{limit}$ determines the amount of torque provided to the motor in each PWM cycle, such that a higher $I_{limit}$ results in a faster change in the BEMF with respect to time. Whether the arm is accelerated or decelerated is determined by the direction of the motor current (i.e. from driver A to driver B or from driver B to driver A) which produces a corresponding direction of the BEMF. When two consecutive states are "idle", implying that the arm is at the command speed, the current limit value is decremented by one step, so as to reach the minimum current limit value, which will result in smoother speed control. When two consecutive states are "decel", implying that the arm is slowing down due to friction, the current limit value is incremated by one step, to provide more torque to overcome the friction When two consecutive states are "accel", the current limit value is incremented by one step, to slow down the arm in a shorter time. For other cases the current limit value is not changed. When two consecutive states are both "accel" or "decel" this indicates that the target BEMF, i.e. the command speed, is father from the current value of the BEMF and accordingly more torque is required per PWM cycle to achieve the target in a shorter time.

TABLE 1

| Decision No. | state$_{i-1}$ | state$_i$ | Change in I$_{limit}$ for state$_i$ |
| --- | --- | --- | --- |
| 1 | idle | idle | Decrement by one step |
| 2 | idle | accel | No change |
| 3 | idle | decel | No change |
| 4 | accel | accel | Increment by one step |
| 5 | accel | decel | No change |
| 6 | accel | idle | No change |
| 7 | decel | decel | Increment by one step |
| 8 | decel | accel | No change |
| 9 | decel | idle | No change |

It will be appreciated by a person skilled in die art that enhancements and alterations may be made to the above-described method without departing from the spirit and scope of the present invention.

What is claimed is:

1. A method of controlling the speed of an arm of a disk drive, including the steps of:

obtaining a feedback signal representative of the speed of said arm;

comparing said feedback signal with a predetermined command signal representing a command speed; and adjusting a drive signal for a motor to drive said arm at said command speed, wherein the comparison of said feedback signal with said predetermined command signal determines an acceleration state of said arm, and said drive signal is adjusted, depending on said acceleration state, to drive said motor at a predetermined level.

2. A method as claimed in claim 1, wherein said step of adjusting includes increasing or decreasing said drive signal.

3. A method as claimed in claim 2, wherein said acceleration state is used with a previous acceleration state to determine whether to increase or decrease said predetermined level.

4. A method as claimed in claim 3, wherein when said acceleration state and said previous acceleration state indicates no acceleration, said predetermined level is decreased.

5. A method as claimed in claim 4, wherein when said acceleration state and said previous acceleration state indicates acceleration, said predetermined level is increased.

6. A method as claimed in claim 5, wherein when said acceleration state and said previous acceleration state indicates deceleration, said predetermined level is increased.

7. A method as claimed in claim 4, further including the step of obtaining a current feedback signal representative of a current supplied to said motor.

8. A method as claimed in claim 7, further including the step of modifying said drive signal in response to said current feedback signal to drive said motor at said predetermined level.

9. A method as claimed in claim 8, wherein said feedback signal represents the back electromotive force (BEMF) of said motor.

10. A method as claimed in any preceding claim, wherein said drive signal is a pulse width modulation (PWM) signal and said BEMF is measured during low pulses of said PWM signal.

11. A method as claimed in claim 1, wherein said command speed corresponds to a speed at which said arm is commanded to move to a parking region.

12. A method as claimed in claim 1, wherein said arm includes a head of said disk drive.

13. A method as claimed in claim 11, further including the step of determining said arm is parked when said BEMF is zero.

14. A method as claimed in claim 13, wherein said arm is parked in said parking region.

15. A method as claimed in claim 14, wherein said parking region includes a ramp.

16. A method as claimed in claim 15, wherein said ramp has a mechanical stopper for stopping said motion of said arm.

17. A method as claimed in any one of claims 11 to 16, wherein said motor is a voice coil motor.

18. A system for controlling the speed of an arm of a disk drive, including:

feedback means for generating a feedback signal representative of the speed of said arm; and drive means for comparing the feedback signal with a predetermined command signal representing a command speed and for adjusting a drive signal for a motor to drive said arm at said command speed, wherein the result of said comparison is used to determine an acceleration state of said arm, said drive signal being adjusted, depending on said acceleration state, to drive said motor at a predetermined level.

19. A system as claimed in claim 18, wherein said adjusting includes increasing or decreasing said drive signal.

20. A system as claimed in claim 19, wherein said acceleration state is used with a previous acceleration state to determine whether to increase or decrease said predetermined level.

21. A system as claimed in claim 20, wherein when said acceleration state and said previous acceleration state indicates no acceleration, said predetermined level is decreased.

22. A system as claimed in claim 21, wherein when said acceleration state and said previous acceleration state indicates acceleration, said predetermined level is increased.

23. A system as claimed in claim 22, wherein when said acceleration state and said previous acceleration state indicates deceleration, said predetermined level is increased.

24. A system as claimed in claim 21, including current feedback means for generating a current feedback signal representative of a current supplied to said motor.

25. A system as claimed in claim 24, wherein said drive means modifies said drive signal in response to said current feedback signal to drive said motor at said predetermined level.

26. A system as claimed in claim 25, wherein said feedback signal represents the back electromotive force (BEMF) of said motor.

27. A system as claimed in claim 18, wherein said drive signal is a pulse width modulation (PWM) signal and said BEMF is measured during low pulses of said PWM signal.

28. A system as claimed in claim 18, wherein said command speed corresponds to a speed at which said arm is commanded to move to a parking region.

29. A system as claimed in claim 16, wherein said arm includes a head of said disk drive.

30. A system as claimed in claim 28, wherein said drive means determines said arm is parked when said BEMF is zero.

31. A system as claimed in claim 30, wherein said arm is parked in said parking region.

32. A system as claimed in claim 31, wherein said parking region includes a ramp.

33. A system as claimed in claim 32, wherein said ramp has a mechanical stopper for stopping said motion of said arm.

34. A system as claimed in any one of claims 28 to 33, wherein said motor is a voice coil motor.

35. A method of controlling the speed of an arm of a disk drive, including the steps of:
    detecting a motion of the arm;
    obtaining a first acceleration state of the arm relative to a command speed at a first time;
    obtaining a second acceleration state of the arm relative to the command speed at a second time; and
    increasing a pulse width modulation current limit value in response to the first acceleration state signifying acceleration and the second acceleration state signifying acceleration.

36. A method of controlling the speed of an arm of a disk drive, including the steps of:
    detecting a motion of the arm;
    obtaining a first acceleration state of the arm relative to a command speed at a first time;
    obtaining a second acceleration state of the arm relative to the command speed at a second time; and
    increasing a pulse width modulation current limit value in response to the first acceleration state signifying deceleration and the second acceleration state signifying deceleration.

37. A method of controlling the speed of an arm of a disk drive, including the steps of:
    detecting a motion of the arm;
    obtaining a first acceleration state of the arm relative to a command speed at a first time;
    obtaining a second acceleration state of the arm relative to the command speed at a second time; and
    decreasing a pulse width modulation current limit value in response to the first acceleration state signifying idle and the second acceleration state signifying idle.

* * * * *